US007345109B2

(12) United States Patent
Schafheutle et al.

(10) Patent No.: US 7,345,109 B2
(45) Date of Patent: Mar. 18, 2008

(54) WATER-DILUTABLE POLYURETHANE DISPERSIONS

(75) Inventors: Markus Schafheutle, Graz (AT); Anton Arzt, Neutillmitsch (AT); Julius Burkl, Graz (AT); Gudrun Garber, St. Josef (AT); Rudolf Jedlicka, Wiener Neustadt (AT); Gerlinde Petritsch, Graz (AT); Jörg Wango, Wundschuh (AT); Renate Pittermann, St. Margarethen/Raab (AT)

(73) Assignee: Cytec Surface Specialties Austria GmbH (AT)

( * ) Notice: Subject to any disclaimer, the term of this patent is extended or adjusted under 35 U.S.C. 154(b) by 0 days.

(21) Appl. No.: 10/561,257

(22) PCT Filed: Jun. 21, 2004

(86) PCT No.: PCT/EP2004/006689

§ 371 (c)(1),
(2), (4) Date: Jun. 7, 2006

(87) PCT Pub. No.: WO2005/000930

PCT Pub. Date: Jan. 6, 2005

(65) Prior Publication Data

US 2007/0083002 A1  Apr. 12, 2007

(30) Foreign Application Priority Data

Jun. 27, 2003  (AT) ............................. A 991/2003

(51) Int. Cl.
C08J 3/00 (2006.01)
C08K 3/20 (2006.01)
C08L 75/00 (2006.01)

(52) U.S. Cl. ............. 524/591; 524/839; 524/840

(58) Field of Classification Search ............ 524/591, 524/839, 840
See application file for complete search history.

(56) References Cited

U.S. PATENT DOCUMENTS

| 3,124,605 A | 3/1964 | Wagner |
| 3,358,010 A | 12/1967 | Britain |
| 3,412,054 A | 11/1968 | Milligan et al. |
| 3,640,924 A | 2/1972 | Trimble et al. |
| 3,903,126 A | 9/1975 | Woerner et al. |
| 3,903,127 A | 9/1975 | Wagner et al. |
| 3,976,622 A | 8/1976 | Wagner et al. |
| 4,046,729 A | 9/1977 | Scriven et al. |
| 4,066,591 A | 1/1978 | Scriven et al. |
| 4,324,879 A | 4/1982 | Bock et al. |
| 4,331,573 A | 5/1982 | Zabrocki et al. |
| 5,494,727 A * | 2/1996 | Kinoshita ............. 428/141 |
| 5,569,707 A | 10/1996 | Blum et al. |
| 5,629,402 A | 5/1997 | Pedain et al. |
| 6,084,051 A | 7/2000 | Blum et al. |

FOREIGN PATENT DOCUMENTS

| DE | 26 24 442 | 12/1976 |
| DE | 27 44 544 | 4/1978 |
| DE | 29 28 552 | 1/1981 |
| EP | 0 525 567 | 2/1993 |
| EP | 0 665 563 | 8/1995 |
| EP | 0 669 352 | 8/1995 |
| GB | 1 575 637 | 9/1980 |

* cited by examiner

*Primary Examiner*—Patrick Niland
(74) *Attorney, Agent, or Firm*—Connolly Bove Lodge & Hutz LLP

(57) ABSTRACT

Water-dilutable polyurethane dispersions comprising structural units derived from polyisocyanates A, polyols B having a number-average molar mass $M_n$ of at least 400 g/mol, compounds D that contain at least two groups reactive towards isocyanate groups and at least one group capable of anion formation, low molar mass polyols E that do not carry any further groups reactive towards isocyanate groups, compounds G that are monofunctional towards isocyanates or contain active hydrogen of different reactivity and that are different from the compounds E, characterised in that the polyols B contain a mass fraction of polycarbonate polyols B1 of at least 85%, and the use thereof in coating compositions

9 Claims, 1 Drawing Sheet

WATER-DILUTABLE POLYURETHANE DISPERSIONS

This application is a national stage application (under 35 U.S.C. 371) of PCT/EP2004/006689 filed Jun. 21, 2004 which claims benefit to Austrian application A 991/2003 filed Jun. 27, 2003.

FIELD OF THE INVENTION

The invention relates to water-dilutable polyurethane dispersions. The invention relates further to the preparation thereof and to the use thereof as paint binders in the production of coatings that exhibit improved hydrolytic stability.

BACKGROUND OF THE INVENTION

"Soft-feel" coatings produced using aqueous binders have been described, for example, in EP-A 0 669 352. The binders used here are aqueous polyester-polyurethane dispersions. The polyester polyols mentioned here may also comprise polycarbonate polyols, the mass fraction thereof, based on the sum of the masses of the high molar mass polyols used, being not more than 75/(75+15)=83.3%.

In the investigations leading to the present invention it has been found that the properties of coatings based on such binders exhibit inadequate stability. Frequently, this becomes evident only when painted objects have been used for a relatively long time, and manifests itself in the formation of a tacky surface which therefore also gets very dirty.

Accordingly, the object is to provide a binder for aqueous coating compositions which results in "soft-feel" coatings having improved properties. This object is achieved by the water-dilutable polyurethane dispersions according to the invention.

SUMMARY OF THE INVENTION

The invention therefore relates to water-dilutable polyurethane dispersions comprising structural units derived from polyfunctional isocyanates A, polyols B having a number-average molar mass $M_n$ of at least 400 g/mol, optionally low molar mass polyols C with $M_n$ less than 400 g/mol, compounds D that contain at least two groups reactive towards isocyanate groups and at least one group capable of anion formation, low molar mass polyols E that do not carry any further groups reactive towards isocyanate groups, compounds G that are monofunctional towards isocyanates or contain active hydrogen of different reactivity and that are different from the compounds E, and optionally compounds H that are different from B, C, D, E and G and contain at least two groups reactive with isocyanate groups. The polyols B comprise a mass fraction of polycarbonate polyols B1 of at least 85%, preferably at least 90% and especially at least 95%. It is particularly preferred to use only polycarbonate polyols B1 for the synthesis of the water-dilutable polyurethane dispersion according to the invention.

Brief Description of the Drawings

Novel features and advantages of the present invention in addition to those noted above will be become apparent to persons of ordinary skill in the art from a reading of the following detailed description in conjunction with the accompanying drawings in which.

DETAILED DESCRIPTION OF THE PREFERRED EMBODIMENTS

Figure 1:
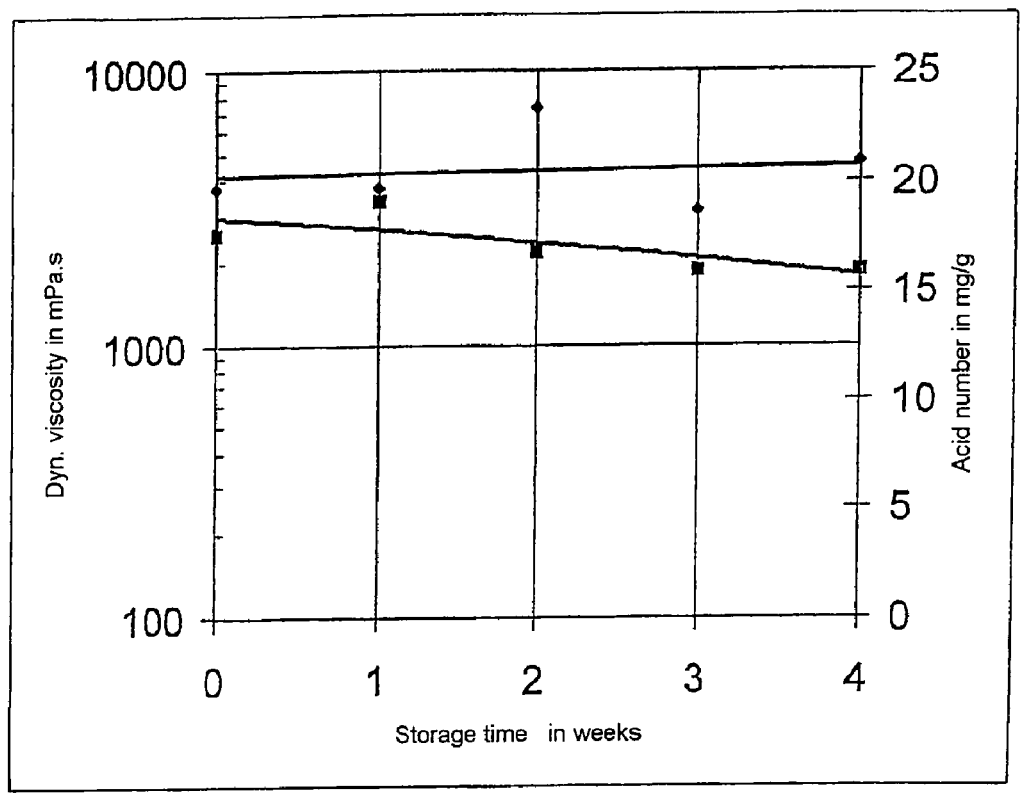
FIG. 1 is a plot showing the change with time in the viscosity and acid number of a polyurethane dispersion according to Example 3 during storage at a temperature of 40° C.

The isocyanates A are at least difunctional and may be selected from aromatic and aliphatic linear, cyclic or branched isocyanates, in particular diisocyanates. If aromatic isocyanates are used, they are preferably used in admixture with the mentioned aliphatic isocyanates. The amount of aromatic isocyanates is preferably to be so chosen that the number of isocyanate groups introduced into the mixture thereby is at least 5% lower than the number of isocyanate groups remaining in the prepolymer produced after the first step. Preference is given to diisocyanates, where up to 5% of the mass thereof may be replaced by trifunctional or higher-functional isocyanates.

The diisocyanates preferably have the formula $Q(NCO)_2$, wherein Q represents a hydrocarbon radical having from 4 to 40 carbon atoms, in particular from 4 to 20 carbon atoms, and preferably an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms or an araliphatic hydrocarbon radical having from 7 to 15 carbon atoms. Examples of such diisocyanates that are preferably to be used are tetramethylene diisocyanate, hexamethylene diisocyanate, 2,2,4- or 2,4,4-trimethylhexamethylene diisocyanate, dodeca-methylene diisocyanate, 1,4-diisocyanatocyclohexane, 3-isocyanatomethyl-3,5,5-trimethylcyclohexyl isocyanate (isophorone diisocyanate, IPDI), 4,4'-diisocyanato-dicyclohexylmethane, 4,4'-diisocyanatodicyclo-hexylpropane-(2,2), 1,4-diisocyanatobenzene, 2,4- or 2,6-diisocyanatotoluene and mixtures of these isomers, 4,4'- or 2,4'-diisocyanatodiphenylmethane, 4,4'-diisocyanatodiphenylpropane-(2,2), p-xylylene diisocyanate, alpha,alpha,alpha',alpha'-tetramethyl-m- or -p-xylylene diisocyanate, and mixtures comprising these compounds.

In addition to these simple polyfunctional isocyanates, isocyanates that contain hetero atoms in the radical linking the isocyanate groups are also suitable. Examples thereof include polyfunctional isocyanates containing carbodiimide groups, allophanate groups, isocyanurate groups, urethane groups, acylated urea groups or biuret groups. With regard to further suitable isocyanates, reference may be made, for example, to DE-A 29 28 552.

Also suitable are "paint polyisocyanates" based on hexamethylene diisocyanate or 1-isocyanato-3,3,5-trimethyl-4-isocyanatomethyl-cyclohexane (IPDI) and/or bis(isocyanatocyclohexyl)-methane, in particular those that are based solely on hexamethylene diisocyanate. "Paint polyisocyanates" based on these diisocyanates are to be understood as being the biuret-, urethane-, uretdione- and/or isocyanurate-group-containing derivatives of these diisocyanates which are known per se and which, following their preparation, have, if required, been cleared of excess starting diisocyanate in a known manner, preferably by distillation, to a residual mass fraction of less than 0.5%. The preferred aliphatic polyfunctional isocyanates to be used according to the invention include biuret-group-containing, hexamethylene-diisocyanate-based polyfunctional isocyanates which satisfy the above-mentioned criteria, as may be obtained, for example, by the processes of US Patent Specifications U.S. Pat. Nos. 3,124,605, 3,358,010, 3,903,126, 3,903,127 or 3,976,622, and which consist of mixtures of N,N,N-tris(6-isocyanatohexyl)-biuret with minor amounts of its higher homologues, as well as the cyclic trimers of hexamethylene diisocyanate which satisfy the mentioned criteria, as may be obtained according to U.S. Pat. No. 4,324,879, and which consist substantially of N,N,N-tris(6-isocyanatohexyl)-isocyanurate in admixture with minor amounts of its higher homologues. Particular preference is given to mixtures of uretdione- and/or isocyanurate-group-containing, hexamethylene-diisocyanate-based polyfunctional isocyanates which satisfy the mentioned criteria, such as are formed by catalytic oligomerisation of hexamethylene diisocyanate using trialkylphosphanes. Particular preference is given to the last-mentioned mixtures having a viscosity at 23° C. of from 50 mpa·s to 20,000 mpa·s and an NCO functionality of from 2.0 to 5.0.

The polyfunctional aromatic isocyanates which are likewise suitable according to the invention but are preferably to be used in admixture with the above-mentioned polyfunctional aliphatic isocyanates are in particular "paint polyisocyanates" based on 2,4-diisocyanatotoluene or commercial mixtures thereof with 2,6-diisocyanatotoluene, or based on 4,4-diisocyanato-diphenylmethane or mixtures thereof with its isomers and/or higher homologues. Such aromatic paint polyisocyanates are, for example, the urethane-group-containing isocyanates, as are obtained by reaction of excess amounts of 2,4-diisocyanatotoluene with polyhydric alcohols, such as trimethylolpropane, and optionally subsequent removal of the unreacted excess diisocyanate by distillation. Further aromatic paint polyisocyanates are, for example, the trimers of the monomeric diisocyanates mentioned by way of example, that is to say the corresponding isocyanato-isocyanurates, which, following their preparation, have optionally been cleared of excess monomeric diisocyanates, preferably by distillation. In the mixtures of aromatic and (cyclo)aliphatic isocyanates, the amounts of these two components are so chosen that it is ensured that the isocyanate groups of the prepolymer are only (cyclo)aliphatically bonded, or at least to an extent of 90%.

The isocyanate component A may further consist of any desired mixtures of the polyfunctional isocyanates mentioned by way of example.

The mass fraction of structural units derived from the polyfunctional isocyanates A in the polyurethane resin is generally approximately from 10% to 50%, preferably from 20% to 35%, based on the mass of the polyurethane resin.

The polycarbonate polyols B1 preferably have a number-average molar mass $M_n$ of from 400 g/mol to 5000 g/mol, especially from 600 g/mol to 2000 g/mol. Their hydroxyl number is generally from 30 mg/g to 280 mg/g, preferably from 40 mg/g to 250 mg/g and especially from 50 mg/g to 200 mg/g. It is preferable to use only difunctional polycarbonate polyols B1; however, up to 5% of the mass of the polycarbonate polyols B1 can be replaced by trivalent or higher-valent polyols.

According to DIN 53 240, the hydroxyl number is defined as the quotient of the mass $m_{KOH}$ of potassium hydroxide that contains exactly as many hydroxyl groups as a sample to be tested, and the mass $m_B$ of that sample (mass of the solid in the sample in the case of solutions or dispersions); its customary unit is "mg/g".

Of these polycarbonate polyols, preference is given to those that contain only terminal OH groups and that have a functionality of less than 3, preferably of from 2.8 to 2 and especially of 2. The preferred polycarbonate polyols are polycarbonates of aliphatic linear, branched or cyclic alcohols B11 having from 2 to 40 carbon atoms, preferably from 3 to 20 carbon atoms, and of alkylene ether alcohols having from 2 to 4 carbon atoms in the alkylene group and from 4 to 20 carbon atoms in total. Particular preference is given to the polycarbonate polyols B1 derived from mixtures of two or more of the alcohols B1. Suitable alcohols B11 are in particular glycol, diethylene glycol, triethylene glycol, 1,2- and 1,3-propanediol, di- and tri-propylene glycol, 1,2- and 1,4-butanediol, 1,6-hexanediol, neopentyl glycol and 1,4-dihydroxycyclohexane. The maximum amount of tri- or poly-hydric alcohols used is such that the mass fraction thereof in the total mass of component B11 is up to 10%. Suitable polyhydric alcohols are in particular trimethylolethane and trimethylolpropane, pentaerythritol and sorbitol. Particular preference is given to mixtures of alkylene ether alcohols and alpha,omega-dihydroxyalkanes.

The polycarbonate polyols B11 are preferably prepared by transesterification of carbonic acid esters of readily volatile alcohols, such as dimethyl carbonate, diethyl carbonate, or cyclic esters of diols, such as ethylene or propylene carbonate, with the alcohols B11 in question or mixtures thereof. It is possible to use transesterification catalysts, such as organotitanium or organotin compounds.

If other polyols are used as component B in addition to the polycarbonate polyols, these other polyols are preferably polyether polyols, such as, for example, polyoxyethylene polyols, polyoxypropylene polyols, polyoxybutylene polyols and especially polytetra-hydrofurans having terminal OH groups. Other polyols which may be used for the present invention are acrylate polyols or polyolefin polyols, as well as dimeric fatty acids reduced to the corresponding diols.

The mass fraction of structural units derived from component B in the polyurethane resin is usually from 40% to 90%, preferably from 50% to 80%, based on the mass of the polyurethane resin.

The low molar mass polyols C which are optionally used in the synthesis of the polyurethane resins generally lead to a stiffening of the polymer chain. They generally have a molar mass of approximately from 60 g/mol to 400 g/mol, preferably from 60 g/mol to 200 g/mol, and hydroxyl numbers of from 200 mg/g to 1500 mg/g. They may contain aliphatic, alicyclic or aromatic groups. The mass fraction thereof, if used, is generally from 0.5% to 20%, preferably from 1% to 10%, based on the mass of the hydroxyl-group-containing components B to D. Suitable choices are, for example, low molar mass polyols having up to about 20 carbon atoms per molecule, for example ethylene glycol, diethylene glycol, 1,2-propanediol, 1,3-propanediol, 1,4-butanediol, 1,2- and 1,3-butylene glycol, 1,2- and 1,4-cyclohexanediol, 1,4-cyclohexanedimethanol, 1,6-hexanediol, bisphenol A (2,2-bis(4-hydroxy-phenyl)propane), hydrogenated bisphenol A (2,2-bis(4-hydroxycyclohexyl)propane) and mixtures thereof, and also, as triols, trimethylolethane and trimethylolpropane. Preference is given to the use only or predominantly (generally more than 90% of the mass, preferably more than 95%) of diols.

If trifunctional or higher-functional compounds are used in the compounds A, B and/or C, it must be ensured that gelling does not occur during synthesis of the prepolymer. This can be prevented, for example, by using monofunctional compounds together with the trifunctional or higher-functional compounds, the amount of monofunctional compounds then preferably being so chosen that the mean functionality of the component in question does not exceed 2.3, preferably 2.2 and especially 2.1.

The anionogenic compounds D contain at least one, preferably at least two, groups that are reactive towards isocyanates, such as hydroxyl, amino and mercaptan groups, and at least one acid group that forms anions on at least partial neutralisation in aqueous solution or dispersion. Such compounds are described, for example, in US Patent Specifications U.S. Pat. No. 3,412,054 and 3,640,924 and in DE laid-open documents 26 24 442 and 27 44 544, to which reference is made here. For this purpose in particular those polyols are suitable, that contain at least one carboxyl group, generally from 1 to 3 carboxyl groups, per molecule, preferably diols. Suitable groups capable of anion formation are also sulfonic acid groups or phosphonic acid groups.

Examples of compounds D are in particular dihydroxycarboxylic acids, such as alpha,alpha-dialkylolalkanoic acids, in particular alpha,alpha-dimethylolalkanoic acids, such as 2,2-dimethylolacetic acid, 2,2-dimethylolpropionic acid, 2,2-dimethylolbutyric acid, 2,2-dimethylolpentanoic acid and the isomeric tartaric acids, and also polyhydroxy acids, such as gluconic acid. Particular preference is given to 2,2-dimethylolpropionic acid. Examples of amino-group-containing compounds D are 2,5-diaminovaleric acid (ornithine) and 2,4-diaminotoluenesulfonic acid-(5). It is also possible to use mixtures of the mentioned compounds D. The mass fraction of structural units derived from component D in the polyurethane resin is generally from 2% to 20%, preferably from 4% to 10%, based on the mass of the polyurethane resin.

The compounds E are located predominantly, preferably to an extent of from 70% to 90%, at the chain ends of the molecules in each case and terminate the molecules (chain terminators). Suitable polyols have at least three, preferably 3 or 4, hydroxyl groups in the molecule. Examples which may be mentioned here include glycerol, hexanetriol, pentaerythritol, dipentaerythritol, diglycerol, trimethylolethane and trimethylolpropane, the latter being preferred. As chain terminator, component E is used in excess, that is to say in such an amount that the number of hydroxyl groups in the amount of component E that is used exceeds the number of isocyanate groups still present in the prepolymer ABCD. The mass fraction of structural units derived from component E in the polyurethane resin is usually from 2% to 15%, preferably from 5% to 15%, based on the mass of the polyurethane resin. In the polyurethane resin, the structural units derived from component E may optionally be admixed with the structural units derived from G and/or H.

The compounds G (chain terminators) are monofunctional compounds that are reactive towards NCO groups, such as monoamines, in particular mono-secondary amines, or monoalcohols. Examples which may be mentioned here include: methylamine, ethylamine, n-propylamine, n-butylamine, n-octylamine, laurylamine, stearylamine, isononyloxypropylamine, dimethylamine, diethylamine, di-n- and di-iso-propylamine, di-n-butylamine, N-methylaminopropylamine, diethyl- and dimethyl-aminopropylamine, morpholine, piperidine, and suitably substituted derivatives thereof, amidoamines of diprimary amines and monocarboxylic acids, as well as monoketimines of diprimary amines, and primary/tertiary amines, such as N,N-dimethylaminopropylamine.

Preferably, compounds that contain active hydrogen having different reactivity towards NCO groups may also be chosen as compounds G, in particular compounds that contain, in addition to a primary amino group, also secondary amino groups, or in addition to an OH group also COOH groups, or in addition to an amino group (primary or secondary) also OH groups, the latter being particularly preferred. Examples thereof include: primary/secondary amines, such as 3-amino-1-methylaminopropane, 3-amino-1-ethylaminopropane, 3-amino-1-cyclohexylaminopropane, 3-amino-1-methylamino-butane; monohydroxycarboxylic acids, such as hydroxyacetic acid, lactic acid or malic acid, also alkanolamines, such as N-aminoethylethanolamine, ethanolamine, 3-aminopropanol, neopentanolamine and, particularly preferably, diethanolamine. It is optionally also possible to use such compounds G that also contain olefinic double bonds in addition to the groups reactive towards isocyanate groups. After application to a substrate, the polyurethanes so obtained can be crosslinked by the action of high-energy radiation, such as UV beams or electron beams.

In this manner, as when using compounds E, additional functional groups can be introduced into the polymeric end product, and the latter can accordingly be rendered more reactive towards curing agents, if this is desired. The mass fraction of structural units derived from component G in the polyurethane resin is usually from 2% to 20%, preferably from 3% to 10%, based on the mass of the polyurethane resin.

The compounds H are the so-called chain extenders. For this purpose, compounds are known to be suitable that are reactive towards NCO groups and are preferably difunctional, which compounds are not identical with B, C, D, E and G and mostly have number-average molar masses of up to 400 g/mol Examples which may be mentioned here include water, diamines, such as ethylenediamine, 1,3-diaminopropane, 1,4-diaminobutane, hexamethylenediamine, isophoronediamine, diethylene-triamine, triethylenetetramine, where the amines may also carry substituents such as OH groups. Such polyamines are described, for example, in DE laid-open document 36 44 371. The mass fraction of structural units derived from component H in the polyurethane resin is usually from 1% to 10%, preferably from 2% to 5%, based on the mass of the polyurethane resin.

The polyurethane resin according to the invention is preferably prepared as follows: a polyurethane prepolymer is first prepared from the polyfunctional isocyanates A, the polyols according to B, optionally the low molar mass polyols C and the compounds D, which prepolymer contains on average at least 1.7, preferably from 2 to 2.5, free isocyanate groups per molecule; the prepolymer is then reacted in a non-aqueous system with the compounds E and/or G, optionally in admixture with small amounts of compounds H, component E being used in a stoichiometric excess (the number of hydroxyl groups in E is greater than the number of isocyanate groups in the prepolymer prepared in the first step), and the fully reacted polyurethane resin is preferably then neutralised and transferred into an aqueous system. The reaction with G may optionally also be carried out after the transfer into the aqueous system.

The preparation of the polyurethane prepolymer in the first step is carried out according to known processes. The polyfunctional isocyanate A is used in excess relative to the polyols B to D, so that a product having free isocyanate groups is obtained. The isocyanate groups are terminal and/or lateral, preferably terminal. Advantageously, the amount of polyfunctional isocyanate A is such that the ratio of the number of isocyanate groups in the amount of component A that is used to the total number of OH groups in the polyols B to D that are used is from 1.05 to 1.4, preferably from 1.1 to 1.3.

The reaction for the preparation of the prepolymer is normally carried out at temperatures of from 55° C. to 95° C., preferably from 60° C. to 75° C., depending on the reactivity of the isocyanate that is used, generally in the absence of a catalyst, but preferably in the presence of solvents that are inactive towards isocyanates. For this purpose, in particular those solvents may be chosen that are compatible with water, such as the ethers, ketones and esters mentioned hereinbelow, as well as N-methylpyrrolidone. The mass fraction of this solvent is advantageously not more than 30% and is preferably in the range from 5% to 20%, in each case based on the sum of the masses of the polyurethane resin and of the solvent. The polyfunctional isocyanate A is advantageously added to the solution of the other components. It is, however, also possible first to add the isocyanate A to the polyol B and optionally component C and to react the prepolymer ABC so produced with component D, which is dissolved in a solvent that is inactive towards isocyanates, preferably N-methylpyrrolidone or ketones, to form the prepolymer ABCD.

The prepolymer ABCD or a solution thereof is then reacted with compounds according to E and/or G, optionally in admixture with H, the temperature advantageously being in the range from 50° C. to 160° C., preferably from 70° C. to 140° C., until the NCO content in the reaction mixture has fallen virtually to zero. If compound E is used, it is added in excess (the number of hydroxyl groups in E exceeds the number of isocyanate groups in the prepolymer ABCD). The amount of E is advantageously such that the ratio of the number of NCO groups in the prepolymer ABCD, or in the prepolymer ABCD(G/H) that has optionally already been reacted with compounds according to G and/or H, to the number of reactive groups of E is from 1:1.05 to 1:5, preferably from 1:1 to 1:3. The mass of G and/or H may be from 0% to 90%, preferably from 2% to 20%, based on the mass of E.

Some of the (non-neutralised) acid groups based to the polyurethane so prepared, preferably from 5% to 30%, may optionally be reacted with difunctional compounds that are reactive with acid groups, such as diepoxides.

For neutralisation of the resulting, preferably COOH-group-containing polyurethane, suitable choices are in particular tertiary amines, for example trialkylamines having from 1 to 12, preferably from 1 to 6, carbon atoms in each alkyl radical. Examples thereof are trimethylamine, triethylamine, methyldiethylamine, tripropylamine. The alkyl radicals may also carry hydroxyl groups, for example, as in the case of dialkylmonoalkanol-, alkyldialkanol- and trialkanolamines. An example thereof is dimethylethanolamine, which is preferably used as neutralising agent.

If the chain extension is carried out in organic phase, or if the neutralisation and the chain extension are carried out in one step together with the dispersion, inorganic bases, such as ammonia or sodium or potassium hydroxide, may optionally also be used as neutralising agents.

The neutralising agent is mostly used in amounts such that the ratio of the amount of substance of amine groups, or hydroxyl ions formed in aqueous solution, to the amount of substance of acid groups of the prepolymer is approximately from 0.3:1 to 1.3:1, preferably approximately from 0.5:1 to 1:1.

Neutralisation which is generally carried out at from room temperature to 110° C., can be effected in any desired manner, for example by adding the water-containing neutralising agent to the polyurethane resin or vice versa. It is, however, also possible first to add the neutralising agent to the polyurethane resin and only then to add the water. In general, a mass fraction of solids in the dispersion of from 20% to 70%, preferably from 30% to 50%, is obtained in this manner.

Coating compositions that comprise the water-dilutable polyurethane dispersions according to the invention as binders result in soft-feel coatings that have considerably improved properties compared with the known coatings, in which polyester polyols are used as structural unit for the polyurethanes, and that, in particular, do not yield tacky surfaces. The advantageous properties are obtained regardless of the substrate that is coated, as has been confirmed by series of tests on metals, plastics, wood and mineral substrates, such as stone and concrete.

The invention is illustrated by the Examples which follow.

EXAMPLES

Example 1

Preparation of a Polycarbonate Diol PC1

600 g of diethylene glycol and 1320 g of 1,6-hexanediol were placed, under a nitrogen atmosphere, in a three-necked flask equipped with a packed column and a dropping funnel and were heated to 200° C. 1.6 g of tetraisopropyl titanate were then added, and a total of 1608 g of dimethyl carbonate was so added, in a submersed manner, that the temperature at the head of the column remained below 59° C. The refractive index of the distillate was checked regularly; it remained in the range from 1.3391 to 1.3395. When the metered addition was complete, the temperature was maintained for a further one hour and was then lowered to 180° C. The unreacted dimethyl carbonate was removed by distillation under reduced pressure (100 hPa to 180 hPa), together with the methanol that had formed; there remained about 2270 g of a polycarbonate diol having a hydroxyl number of 171 mg/g, a Staudinger index (measured in chloroform at 23° C.) of 8.6 cm$^3$/g and a dynamic viscosity (25 s$^{-1}$; 23° C.) of 3690 mpas.

Example 2

Preparation of a Polycarbonate diol PC2

In accordance with the procedure of Example 1, 600 g of diethylene glycol, 1257 g of 1,6-hexanediol and 48 g of trimethylolpropane were placed in a reaction vessel; using the same amounts of catalyst and dimethyl carbonate, 2255 g of a polycarbonate polyol having a hydroxyl number of 170 mg/g were obtained.

Example 3

Polyurethane Dispersion 1

935 g of the polycarbonate diol PC1 from Example 1, 20 g of trimethylolpropane and 73 g of dimethylolpropionic acid were placed in a reaction vessel and heated at 120° C. until a clear solution had formed. Over a period of about 90 minutes, 260 g of hexamethylene diisocyanate were metered in at that temperature, in a submersed manner, with cooling. After stirring for one further hour, cooling to 95° C. was carried out, and a mixture of 39 g of dimethylethanolamine and 39 g of demineralised water was stirred in in the course of 15 minutes. A further 1210 g of water were then stirred in at from 85° C. to 90° C.; the resulting dispersion was then stirred for a further one hour at that temperature. After cooling to about 30° C., filtration was carried out through a 25 µm nonwoven filter. There were obtained 2576 g of a polyurethane dispersion having a mass fraction of solids of about 50%, a dynamic viscosity of about 34,300 mpas, an acid number of about 22 mg/g and an amine number of about 19.1 mg/g. After dilution with water to a mass fraction of solids of 10%, the pH value was determined as 7.5.

Example 4

Polyurethane Dispersion 2

In accordance with the procedure of Example 3, a polyurethane dispersion was prepared from 955 g of the polycarbonate polyol PC2 from Example 2, 73 g of dimethylolpropionic acid, 260 g of hexamethylene diisocyanate and a mixture of 39 g of dimethylethanol-amine and 39 g of water. After dilution with 1210 g of water, cooling and filtration over a 25 µm nonwoven filter, 2576 g of a polyurethane dispersion having a mass fraction of solids of about 50% and a viscosity of about 25,100 mpa·s were obtained.

Example 5

Polyurethane Dispersions 3 (Chain Extended)

Example 5.1

Prepolymer 955 g of the polycarbonate polyol PC2 of Example 2 and 73 g of dimethylolpropionic acid were placed in a reaction vessel and heated to 100° C. until a clear solution had formed. The mixture was then cooled to 60° C., whereupon it became slightly cloudy. Over a period of about 30 minutes, 417 g of hexamethylene diisocyanate were metered in at that temperature, in a submersed manner, with cooling. Stirring was continued until the mass fraction of free isocyanate groups in the reaction mixture had fallen to about 2.8%.

Example 5.2

Polyurethane Dispersion

In a further reaction vessel, 91 g of diethanolamine, 2265 g of water and 39 g of dimethylethanolamine were mixed; the mixture was heated to 60° C., and then the prepolymer of Example 5.1 was dispersed therein, with thorough stirring. After stirring for one further hour, the mixture was cooled to 35° C. and filtered through a 25 µm nonwoven filter. 3840 g of a polyurethane dispersion having a mass fraction of solids of about 40% were obtained.

Example 6

Polyurethane Dispersion 4

The procedure of Example 5 was repeated, 935 g of the polycarbonate diol PC1 of Example 1, 20 g of trimethylolpropane and 73 g of dimethylolpropionic acid being placed in the reaction vessel. After addition of 417 g of hexamethylene diisocyanate, the mixture was reacted until the mass fraction of free isocyanate groups had fallen to about 2.8%. The prepolymer was dispersed with a mixture of 39 g of dimethylethanolamine and 1000 g of water, which had been adjusted to a temperature of 60° C., dispersed, and was then further reacted 10 minutes later with a mixture of 28.3 g of triethylenetetramine and 451 g of water. After filtration via a 25 µm nonwoven filter, 2960 g of a polyurethane dispersion having a mass fraction of solids of about 49% and a viscosity (23° C., 25 s$^{-1}$) of 1300 mPa·s were obtained.

Example 7

Comparison Example

Example 7.1

Polyester Polyol

A mixture of 32.2 kg of diethylene glycol and 16.42 kg of ethylene glycol was heated to 150° C. with 72 kg of adipic acid, with addition of 330 g of dibutyltin dilaurate. The water that formed was removed by azeotropic distillation with xylene, which latter was fed back after water had been separated, the temperature being raised to 220° C. in the course of three hours. The mixture was maintained at that temperature until an acid number of less than 3 mg/g had been achieved. The hydroxyl number of the resulting polyester was about 50 mg/g; a viscosity of about 10 mPa·s was measured at 23° C. and with a shear gradient of 25 s$^{-1}$.

Example 7.2

Polyester Urethane 9.8 kg of the polyester polyol of Example 7.1 were mixed with 345 g of trimethylolpropane, 25 g of ethylene glycol, 109 g of 1,6-hexanediol and 741 g of dimethylol-propionic acid, and the mixture was heated to 130° C. When that temperature had been reached, 1730 g of 1,6-diisocyanatohexane were added over a period of about 20 minutes, and that temperature was maintained for one further hour. After cooling to 80° C., the mixture was neutralised by addition of about 290 g of dimethylethanolamine and was dispersed in about 10 kg of water to give a finely divided dispersion having a mass fraction of solids of about 55%. The dispersion had a viscosity of about 1000 mPa·s at 23° C. and with a shear gradient of about 25 s$^{-1}$. The hydroxyl number was about 40 mg/g and the acid number was about 27 mg/g (in each case based on the solids in the dispersion).

Example 8

Paint Formulation

A two-component paint (paint A) having the following formulation was prepared, subsidiary steps denoted by Roman numerals being carried out in succession:
I (80.00 g of polyurethane dispersion of Example 3
  (6.70 g of deionised water
  (0.50 g of ®DNE antifoam (Bayer AG)
  (1.50 g of methoxypropanol
II (1.60 g of ®Colanyl black PR 130 (Clariant Deutschland GmbH)
  (9.00 g of ®Acematt TS 100 (Degussa AG) (silica)
III (0.10 g of dibutyltin dilaurate
  (0.40 g of ®Byk 346 (Byk) (wetting agent, polyether-modified polydimethylsiloxane)
  (0.20 g of ®DNE antifoam (Bayer AG)
  100.0 g
IV (component 2,
  (10.0 g ®Bayhydur 3100 (Bayer AG)

In order to prepare the paint, part I was placed in a vessel and mixed thoroughly. The components of part II were then added and the mixture was dispersed for 20 minutes in a bead mill. The components of part III were then added. Immediately prior to processing, part IV, ®Bayhydur 3100, was added.

The mixture of parts I to III had a mass fraction of solids of about 50%; the paint produced (parts I to IV) had a viscosity, as measured as the efflux time from a beaker according to DIN EN ISO 2431 at 23° C. and with an outlet opening having a diameter of 5 mm of about 38 s. The pigment/binder ratio (mass of the pigment divided by the mass of the solids content of the binder) was 0.2:1. The pot life of the ready-mixed mixture (parts I to IV) was about four hours at room temperature (23° C.) in an open vessel.

As comparison example, a comparative paint (paint V) was prepared in the same manner except that the dispersion of Example 7 was used.

Example 9

Testing of the Paints

The two polyurethane dispersions from Examples 3 and 7 (comparison) were stored for 4 weeks at 40° C. Each week, the acid number was titrated and the viscosity was measured. The dispersion according to the invention of Example 3 remained unchanged during that time. In the case of the dispersion according to Comparison Example 7, the acid number increased markedly and the viscosity fell by over 3 powers of ten.

Figure 2:
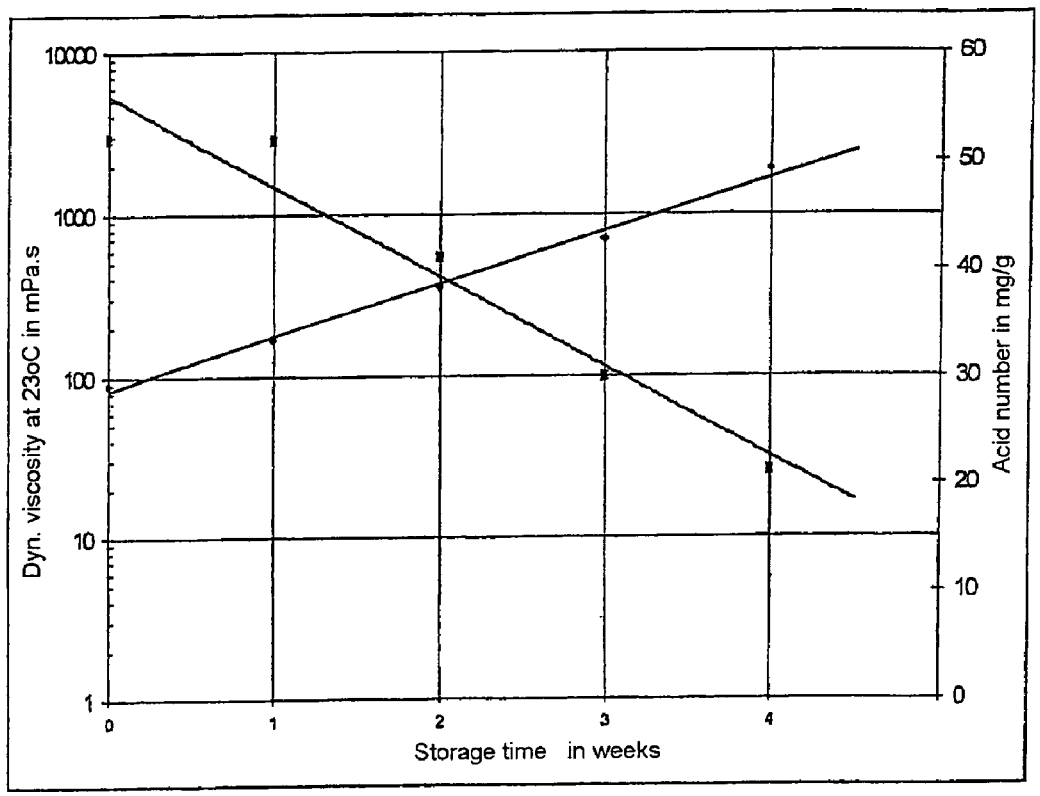
FIG. 2 is a plot showing the change in viscosity of a dispersion and acid number for a polyurethane dispersion of comparison Example 7.

The results of this storage test are shown in FIGS. 1 and 2. FIG. 1 shows the change with time in the viscosity and acid number of the polyurethane dispersion according to Example 3 during storage at a temperature of 40° C. FIG. 2 shows the change in viscosity of the dispersion and acid number for the polyurethane dispersion of the comparison example (Example 7).

Using paint A according to the invention and paint V of Example 8, which serves as comparison, coatings were produced by spraying on PVC sheets, which coatings, after an aeration time of 30 minutes at room temperature, were dried in a furnace for 30 minutes at 80° C. The sheets so coated were force-aged for a further 24 hours at 60° C. Both sheets were then stored for 3 days in a climatic cabinet which contained an atmosphere saturated with steam at 90° C. The haptics of the coatings so aged was tested. The PVC sheet coated with paint A according to the invention remained unchanged. The coating with paint V of the comparison example exhibited slight surface tackiness.

The invention claimed is:

1. Water-dilutable polyurethane dispersions comprising structural units derived from polyisocyanates A, polyols B having a number-average molar mass $M_n$ of at least 400 g/mol, compounds D that contain at least two groups reactive towards isocyanate groups and at least one group capable of anion formation, low molar mass polyols E that do not carry any further groups reactive towards isocyanate groups, compounds G that are monofunctional towards isocyanates or contain active hydrogen of different reactivity and that are different from the compounds E, characterised in that the polyols B contain a mass fraction of polycarbonate polyols B1 of at least 85%, wherein the polycarbonate polyols B1 are derived from mixtures of alkylene ether alcohols having from 2 to 4 carbon atoms in the alkylene group, and from 4 to 20 carbon atoms in total, and alpha, omega-dihydroxvalkanes.

2. The water-dilutable polyurethane dispersions according to claim 1, characterised in that they additionally comprise structural units derived from low molar mass polyols C with $M_n$ of less than 400 g/mol.

3. The water-dilutable polyurethane dispersions according to claim 1, characterised in that they additionally comprise structural units derived from compounds H that are different from B, C, D, E and G and contain at least two groups reactive towards NCO groups.

4. The water-dilutable polyurethane dispersions according to claim 1, characterised in that the polycarbonate polyols B1 have a number-average molar mass $M_n$ of from 400 g/mol to 5000 g/mol and a hydroxyl number of from 30 mg/g to 280 mg/g.

5. The water-dilutable polyurethane dispersions according to claim 1, characterised in that there are used as component B1 only difunctional polycarbonate polyols B1.

6. The water-dilutable polyurethane dispersions according to claim 1, characterised in that up to 5% of the mass of the polycarbonate polyols B1 are trivalent or higher-valent polycarbonate polyols.

7. The water-dilutable polyurethane dispersions according to claim 1, characterised in that the polycarbonate polyols B1 contain only terminal OH groups.

8. The water-dilutable polyurethane dispersions according to claim 1, characterised in that component B comprises further poiyois selected from the group consisting of polyether polyols, acrylate polyols and polyolefin polyols.

9. Coating compositions comprising water-dilutable polyurethane dispersions according to claim 1.

* * * * *